United States Patent
Hoffmann

[19]

[11] Patent Number: 5,950,974
[45] Date of Patent: Sep. 14, 1999

[54] ARRANGEMENT FOR FASTENING AND WIRING OF A PLURALITY OF ELECTRICAL UNITS, PARTICULARLY IN A SWITCHGEAR CABINET

[76] Inventor: Gerhard Hoffmann, Am Buchenrain 4, 71522 Backnang, Germany

[21] Appl. No.: 09/122,838

[22] Filed: Jul. 27, 1998

[30] Foreign Application Priority Data

Sep. 10, 1997 [DE] Germany .................. 297 16 229 U

[51] Int. Cl.⁶ .......................... A47B 96/06; A47G 29/02; A47F 7/14; F16L 3/00
[52] U.S. Cl. .............................. 248/223.41; 248/232.41; 248/245; 248/906; 248/73
[58] Field of Search ........................... 248/68.1, 73, 906, 248/909, 223.41, 225.11, 245; 52/126.1, 126.2, 220.22, 220.1, 220.3, 220.5, 645, 648.1, 650.1, 653.1, 655.1, 221, 64; 174/138 G, 52.1, 58, 48, 49; 403/381, 403

[56] References Cited

U.S. PATENT DOCUMENTS

| | | | |
|---|---|---|---|
| 3,686,805 | 8/1972 | Pofferi .................................... | 52/64 |
| 4,212,445 | 7/1980 | Hagen ..................................... | 248/245 |
| 4,678,151 | 7/1987 | Radek .................................... | 248/223.41 |
| 5,240,213 | 8/1993 | Horcher ................................. | 248/223.41 |

*Primary Examiner*—Leslie A. Braun
*Assistant Examiner*—David Heisey
*Attorney, Agent, or Firm*—Adams Law Firm, P.A.

[57] ABSTRACT

An apparatus for fastening and wiring of a plurality of electrical units, particularly in a switchgear cabinet. At least one mounting crosspiece (12–15) accommodating the electrical units on its mounting side can be fastened to at least two bearing rails (10, 11) arranged vertically and behind them, fasteners for fastening the electrical units on the mounting crosspiece (12–15) being provided. This mounting crosspiece (12–15) shaped like a flat strip has, on its rear side opposite the mounting side (29), an integrally formed holding rib (28) extending over its length and having a mounting groove (30) open toward the mounting side (30) designed for accommodating the heads (33) of mounting screws (34) for fastening the mounting crosspiece (12–15) by means of the holding rib (28) on the bearing rails (10, 11). At least one of the two opposite longitudinal edges of the mounting crosspiece (12–15) shaped like a flat strip can be provided with a wiring comb (39). This makes it possible to achieve a very small constructional depth and reduce the number of mounting parts at the same time, the space behind the mounting crosspiece being almost completely usable as wiring space.

11 Claims, 2 Drawing Sheets

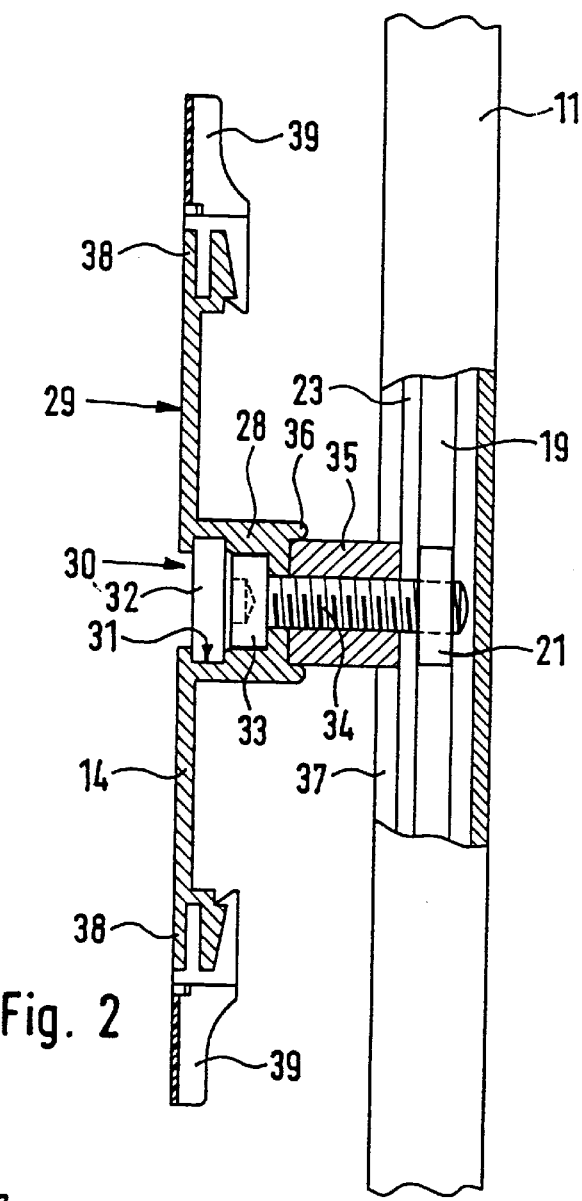
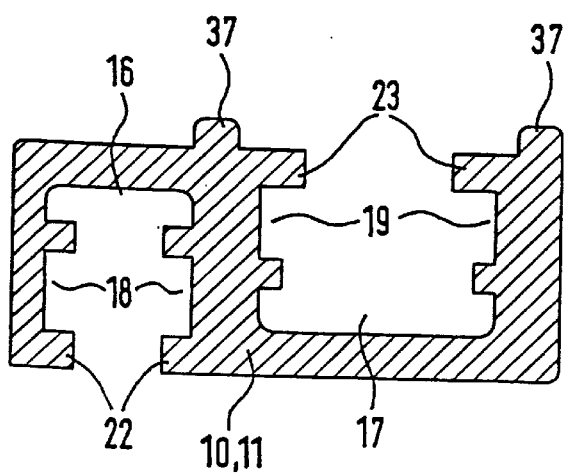

ARRANGEMENT FOR FASTENING AND WIRING OF A PLURALITY OF ELECTRICAL UNITS, PARTICULARLY IN A SWITCHGEAR CABINET

PRIORITY CLAIM

This application claims priority based upon German utility model patent application 297 16 229.2, filed on Sep. 10, 1997.

TECHNICAL FIELD AND BACKGROUND OF THE INVENTION

The invention relates to an arrangement for fastening and wiring of a plurality of electrical units, particularly in a switchgear cabinet, which has at least one mounting crosspiece accommodating the electrical units on its mounting side and which can be fastened to at least two vertical bearing rails arranged behind, fastening means being provided for fastening the electrical units on the mounting crosspiece. Arrangements of this type for switchgear cabinets are known, for example, from the "LSC Wiring System" catalog of the firm of Friedrich Luetze GmbH & Co. The known mounting crosspieces have an essentially U-shaped cross-section and are connected at the edge with a frame construction by means of U-shaped mounting clamps. Due to the folded U-leg of the mounting crosspieces, the space behind these mounting crosspieces is difficult to access and is not available as wiring space. If needed mounting depth is provided, there are hardly any problems in the case of use in large switchgear cabinets. However, the switchgear cabinets are becoming ever smaller, because of ever smaller electrical units and progressive integration so that the role of the structural depth is becoming increasingly important. For this reason, one object of the present invention consists in improving an arrangement of the type mentioned at the outset so that a considerably smaller structural depth is achievable for use in very small switchgear cabinets as well. This object is achieved by the invention in that the mounting crosspiece shaped like a flat strip has, on its rear side opposite the mounting side and extending over its length, an integrally formed holding rib with a mounting groove open toward the mounting side, in that the mounting groove is designed to receive the heads of mounting screws for fastening the mounting crosspiece to the bearing rails by means of the holding rib, and in that at least one of the two opposed longitudinal edges of the mounting crosspiece shaped like a flat strip is provided with a wiring comb. The invented mounting crosspieces can be fastened without mounting clamps to two bearing rails which achieves not only a decrease in structural depth but also a reduction in mounting parts. Because of the design of the mounting crosspiece with the shape of a flat strip and without folded areas or legs, the space behind the mounting crosspiece is fully utilizable as wiring space except for the minor amount of space needed for the holding ribs, which is especially important and advantageous for very flat designs. The wiring comb arranged on at least one of the longitudinal edges does not represent any noticeable impairment of the access to the wiring space either. Mounting can thus be simpler and faster, which means a considerable savings in costs. The mounting crosspieces can extend up to the side walls of the switchgear cabinet since no mounting manipulations are to be carried out at the edge areas but rather only in the area of the inwardly shifted bearing rails. The arrangement of the bearing rails, particularly with respect to the interval between them, can be selected within wide ranges, so that there will be no problems with adjustment to local conditions. Advantageous further developments and improvements of the arrangement indicated in claim 1 are possible by applying the measures given in the sub-claims. It will be suitable for the arrangement of the holding rib to be substantially central and the holding rib will preferably have a substantially U-shaped cross-section. The central arrangement automatically provides for a symmetrical distribution of the available wiring space. Advantageously, both longitudinal edges of the mounting crosspiece are designed for plugging or locking in one wiring comb each, and both longitudinal edges of the mounting crosspiece are preferably designed as receptacles for plugging or locking in wiring combs. Simple plugging and locking in place make it possible to have rapid and simple snap mounting, and the wiring combs can be arranged as desired on only a few mounting crosspieces and there on both the longitudinal edges or only on one. Simple snap mounting also makes it possible to make rapid changes. The wiring space can be made as desired to meet requirements through the provision of spacers with recesses for the mounting screws between the holding rib and the bearing rails. At the same time, these spacers can serve to establish the right angle between the mounting crosspieces and the bearing rails and prevent a change in angle in that the spacers have a substantially square cross-section and they can be mounted in a torsionally stiff way by means of a groove-like depression on the side of the holding rib and by means of a groove-like depression on the side of the bearing rails. Preferably, the groove-like depressions will be formed between two bead-like projections extending in the longitudinal direction, that is, on both the holding rib and the bearing rails. The right angle will thereby be permanently fixed automatically when screws are tightened. It will be advantageous for the bearing rails to have at least one mounting groove that is open toward the holding rib and guides the sliding nuts cooperating with the mounting screws for longitudinal displacement. This makes it possible, with a slight loosening of the mounting screws, to shift the mounting crosspieces anywhere along the bearing rails and fix them rapidly and simply in the desired position. In addition, the bearing rails can also have a further mounting groove that is open toward the opposite side and guides the sliding nuts cooperating with further mounting screws for mounting the bearing rails on a cabinet wall or on holding means for longitudinal displacement. Preferably, holding strips that can be connected with the staybolts otherwise present in switchgear cabinets for mounting in such cabinets will be provided, the holding strips having slots for connection with the further mounting groove of the bearing rails. Here too, the position of the bearing rails can thus be freely selected within wide ranges and fixed by tightening the further mounting screws. This ensures a variable installation in switchgear cabinets with different dimensions. Sliding nuts are provided as fastening means for fastening the electrical units or the like on the mounting crosspieces, these nuts being longitudinally displaceable in guides in the mounting groove of the holding rib and spaced away from the base of the mounting groove such that the heads of the mounting screws are arranged outside the path of motion of the sliding nuts. This makes it possible to displace electrical units, for example, and to position them by means of sliding nuts without the heads of the mounting screws having any effect on free mobility. Alternative fastening means for fastening the electrical units can be created to advantage by providing the mounting crosspiece on the mounting side with two integrally formed hook-like strips for forming a cover rail or a C-rail. In particular, the two strips in this case are arranged symmetrically on both sides of the mounting groove. In this way, conventional cover rails, for example, can be formed simply with the invented arrangement. A number of parallel mounting crosspieces can be arranged in an advantageous way on the two bearing rails in particular. Mounting crosspieces having dimensions and/or fastening means designs that are different can also be placed in this case on the two bearing rails in any arrangement desired. An example embodiment of the invention is depicted in the drawing and explained in more detail in the description following.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 2 is a sectional view of a mounting crosspiece arranged on a bearing rail; and FIG. 3 is a sectional view of a bearing rail with two mounting grooves open toward opposite sides.

DESCRIPTION OF THE PREFERRED EMBODIMENT AND BEST MODE

Figure 1:
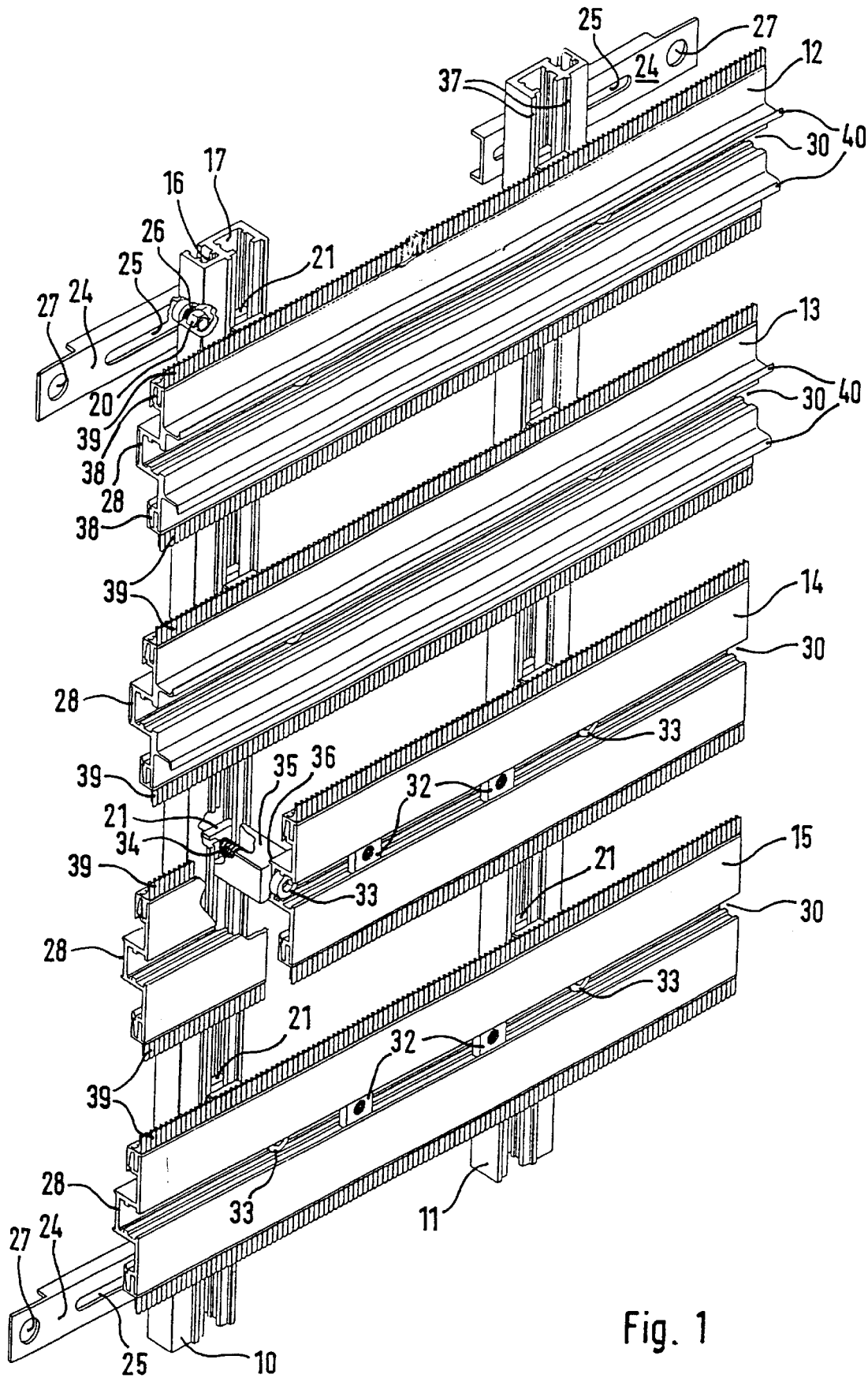
FIG. 1 is a view in perspective of an overall arrangement of two vertical bearing rails, which are provided with four mounting crosspieces in two designs.

Referring now specifically to the drawings, in a preferred embodiment shown in FIGS. 1 and 2, two bearing rails 10, 11 are mounted vertically in a switchgear cabinet (not shown), for example. Four horizontal mounting crosspieces 12–15 are fixed perpendicularly to the bearing rails 10, 11. Starting with a certain length of the mounting crosspieces 12–15, further bearing rails can be added if the self-supporting length of the mounting crosspieces 12–15 between these bearing rails 10, 11 becomes too great.

According to FIG. 3, the bearing rails 10, 11 have two mounting grooves 16, 17 open toward opposite sides. These mounting grooves 16, 17 are provided with sliding guides 18, 19 for sliding nuts 20, 21, which are displaceably guided in the longitudinal direction along these sliding guides 18, 19, but are prevented from being drawn out of the mounting grooves 16, 17 by the crosspieces 22, 23 limiting the openings of the mounting grooves 16, 17. The smaller mounting groove 16 serves for fastening the bearing rails 10, 11 on holding strips 24 or on other holding means and/or on the rear wall of a switchgear cabinet. For this purpose, these holding strips 24 each have a slot 25 through which a mounting screw 26 engages the mounting groove 16 and can be anchored on a sliding nut 20.

At the opposite end, the holding strips 24 have a fastening hole 27 engaged for fastening, e.g., by a staybolt (not shown) anchored on a switchgear cabinet. Such staybolts are usually arranged in any case on switchgear cabinets in the four corner areas. They can serve for fastening the holding strips 24 in the way described using holding nuts, and the bearing rails can still be displaced laterally and positioned depending on the length of the slots 25. The bearing rails 10, 11 can be positioned in any case in the vertical direction by displacing the sliding nuts 20 in the sliding guides 18. Of course, it is also possible to fix the bearing rails 10, 11 directly to the rear wall of a switchgear cabinet. The smaller mounting grooves 16 being eliminated, these rails can have a simpler design and have only a U-shape, for example. For fastening purposes, holes can be drilled into the base of the bearing rails 10, 11 which can serve for direct fastening on the rear wall of a switchgear cabinet.

Since the sliding guides 19 are arranged at a distance from this base, the heads of the holding screws so employed do not hinder the movement of the sliding nuts 21 for fastening the mounting crosspieces 12–15. The mounting crosspieces 12–15 have a design that is substantially shaped like a flat strip and have an integrally formed holding rib 28 on their rear side facing the bearing rails 11, 12, this rib extending over the entire length of the mounting crosspieces 12–15 and having a substantially U-shaped cross-section so that a mounting groove 30 is formed on the mounting side 29 of the mounting crosspieces 12–15 that is opposite the rear side.

The holding ribs 28 can be arranged centrally on the mounting crosspieces 12–15, as shown, but an offset arrangement is also possible in principle. As with the mounting grooves 16, 17, the mounting groove 30 also has a sliding guide 31 for sliding nuts 32 which are guided therein as is the case with the sliding nuts 20, 21. A spacing is provided between the sliding guide 31 respectively the sliding nuts 32 and the base of the holding rib 28 so that the heads 33 of mounting screws 34 can be accommodated for fastening the mounting crosspieces 12–15 on the bearing rails 10, 11 without impairment of the motion of the sliding nuts 32.

These mounting screws 34 extend through the base of the base of the holding ribs 28 and through distance pieces 35 as far as the sliding guides 19 of the bearing rails 10, 11 and are fixed there to the sliding nuts 21 in the assembled condition. The spacers 35 have a square cross-section and, one hand, make an engagement on the holding rib 28 between two lateral bead-like projections 36 in the form of rounded off strips so as to achieve protection against torsion around the longitudinal axis of the mounting screw 34. At the opposite end, similarly, the spacers 35 make an engagement between two similar bead-like projections 37 on the bearing 10, 11 so that protection against torsion is achieved relative to the bearing rails 10, 11 as well.

The mounting crosspieces 12–15 in the fixed condition are therefore fastened on the bearing rails 10, 11 precisely at right angles and cannot be turned relative to them. This facilitates precise mounting of the entire arrangement. Of course, corresponding bead-like projections and/or depressions could be provided on the spacers 35 as well so as to achieve a corresponding torsionally stiff engagement of the holding ribs 28 or bearing rails 10, 11. To facilitate mounting, the spacers 35 can also be slotted at the side (manner not shown) so that they can be pushed on the mounting screws 34 at the side. The length of the spacers 35 depends on the size of the desired or required wiring space, that is, the space between the mounting crosspieces 12–15 and the rear wall of the switchgear cabinet. For this purpose, spacers 35 can also be provided in different lengths to be used as needed. The spacers 35 can be eliminated in the simplest case or they can be integrally formed on the holding rib 28.

The mounting crosspieces 12–15 are designed as flat strips up to the integrally formed holding ribs 28. Plug-in receptacles 38 for wiring combs 39 are integrally formed on the two opposite end edges. Wiring combs of this type are known from the catalog indicated in the beginning, for example, or from DE 43 23 370. These wiring combs 39 have a plurality of adjacently arranged teeth between which cables and leads can be inserted and thus fixed in place. The wiring combs 39 can be cut to any length and their length can thus be adjusted to that of the mounting crosspieces 12–15. The wiring combs 39 are releaseably locked in place by simply plugging the wiring combs 39 in the plug-in receptacles of the mounting crosspieces 12–15. The teeth of the wiring combs 39 extend thereby in the same plane as that of the plate-shaped mounting crosspieces 12–15.

Of course, it is not necessary in every case to plug in wiring combs 39 on both end edges of the mounting crosspieces 12–15, but rather only as required. The mounting crosspieces 12–15 serve for fastening electrical units as used in switchgear cabinets, for example, and are arranged there in rows as switching and control modules. Such modules often have standardized housings in different widths and can be designed, for example, as relay modules, power-supply units, indicator modules, interference-suppression modules, input/output modules, rectifier modules, disconnect modules and the like. Sliding nuts 32, for example, are used for fastening, but these kinds of electrical units or modules are often also designed for plugging on standardized cover rails or C-rails. The two mounting crosspieces 12, 13 at the top of FIG. 1 are provided with such cover rails 40. The cover rails 40 are formed of two strips with a hook-like cross-section, the hook ends extending to opposite sides. These two strips are arranged on both sides of the mounting groove 30.

According to FIG. 1, these cover rails 40 are integrally formed on the mounting crosspieces 12, 13. Of course, it is also possible to use sliding nuts 32 to fix finished cover rails as separate components on the mounting crosspieces 14, 15 that do not have integrally formed cover rails 40. The mounting crosspieces 12–15 and the bearing rails 10, 11 can be cut to any length desired and can thus be adjusted to the dimensions of a switchgear cabinet, for example. Different widths of mounting crosspieces 12–15 may be the most suitable, depending on the type of electrical units used. The mounting crosspieces 12–15 can thus be made available in different widths, and mounting crosspieces of different widths can also be mounted inside a switchgear cabinet, some with cover rails, some without depending on suitability.

Aluminum or aluminum alloys are suitable as material for the bearing rails 10, 11 and mounting crosspieces 12–15. Of course, plastic designs are also possible. The wiring combs 39 are preferably made of plastic.

A arrangement for fastening and wiring of a plurality of electrical units, particularly in a switchgear cabinet, is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An apparatus for fastening and wiring a plurality of electrical units, comprising:
   (a) at least one mounting crosspiece for accommodating the electrical units on a front mounting side of said mounting crosspiece and to be fastened to at least one vertical bearing rail, said at least one mounting crosspiece defining a flat strip portion on a rear side opposite the front mounting side, said mounting crosspiece having an integrally formed, elongate holding rib having a mounting groove open toward the front mounting side, wherein the mounting groove receives a head of a mounting screw for fastening the at least one mounting crosspiece to the at least one bearing rail by means of the holding rib, and further wherein at least one of the flat strip portions of the at least one crosspiece is provided with a plug-in receptacle having a wiring comb secured therein; and
   (b) fastening means on said front mounting side of said mounting crosspiece for fastening the electrical units on the at least one mounting crosspiece.

2. An apparatus as claimed in claim 1, wherein the holding rib is positioned substantially centrally with respect to the at least one mounting crosspiece.

3. An apparatus as claimed in claim 1, wherein first and second longitudinal edges of the at least one mounting crosspiece includes means for receiving one wiring comb.

4. An apparatus as claimed in claim 1, wherein spacers are provided between the holding rib and the at least one bearing rail with recesses for mounting screws.

5. An apparatus as claimed in claim 4, wherein the spacers have a substantially rectangular, in particular square cross-section and are mounted with torsional stiffness by means of a groove-like depression on the side of the holding rib and by means of a groove-like depression on the side of the at least one bearing rail, the groove-like depressions preferably being formed between two bead-like longitudinally-extending projections.

6. An apparatus as claimed in claim 4, and including a pair of spaced-apart bearing rails, and wherein the bearing rails each have at least one mounting groove that is open toward the holding rib and in which sliding nuts are provided for cooperating with the mounting screws for guided longitudinal displacement.

7. An apparatus as claimed in claim 6, wherein the bearing rails each have a further mounting groove that is open toward a rear side of the bearing rails and in which the sliding nuts cooperate with further mounting screws for fastening the bearing rails on a switchgear cabinet.

8. An apparatus as claimed in claim 7, and including holding means connectable with staybolts of a switchgear cabinet, said holding means having slots for connection of switchgear cabinet with the bearing rails.

9. An apparatus as claimed in claim 7, wherein sliding nuts are guided for longitudinal displacement in guides in the mounting groove of the holding rib and are arranged at a distance from the base of the mounting groove so that the heads of the mounting screws are arranged outside the path of motion of the sliding nuts.

10. An apparatus as claimed in claim 7, wherein the mounting crosspieces are provided on the front mounting side with two hook-like strips, integrally formed and arranged symmetrically on both sides of the mounting groove to form a cover rail.

11. An apparatus as claimed in claim 7, wherein a plurality of parallel mounting crosspieces having different dimensions are arranged on at least two bearing rails.

* * * * *